US008116307B1

(12) United States Patent
Thesayi et al.

(10) Patent No.: US 8,116,307 B1
(45) Date of Patent: Feb. 14, 2012

(54) PACKET STRUCTURE FOR MIRRORED TRAFFIC FLOW

(75) Inventors: Suresh Thesayi, Nashua, NH (US); Derek Harkness, Munich (DE); Jim Waclawik, Blackstone, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2171 days.

(21) Appl. No.: 10/948,072

(22) Filed: Sep. 23, 2004

(51) Int. Cl.
*H04L 12/28* (2006.01)

(52) U.S. Cl. ........ 370/389; 370/471; 370/474; 709/227; 709/238

(58) Field of Classification Search .................... 726/22; 709/246, 203, 227, 238; 370/409, 389, 471, 370/474
See application file for complete search history.

(56) References Cited

U.S. PATENT DOCUMENTS

| 6,041,042 | A * | 3/2000 | Bussiere | 370/245 |
|---|---|---|---|---|
| 6,101,549 | A * | 8/2000 | Baugher et al. | 709/238 |
| 6,480,892 | B1 * | 11/2002 | Levay et al. | 709/224 |
| 7,046,663 | B1 | 5/2006 | Temoshenko et al. | |
| 7,092,493 | B2 | 8/2006 | Hou et al. | |
| 7,228,414 | B2 | 6/2007 | Smith et al. | |
| 7,228,415 | B2 | 6/2007 | Eschbach et al. | |
| 7,242,681 | B1 * | 7/2007 | Van Bokkelen et al. | 370/389 |
| 7,283,521 | B1 | 10/2007 | Ryan | |
| 7,447,909 | B2 | 11/2008 | Reith | |
| 7,461,152 | B2 | 12/2008 | Bird et al. | |
| 2002/0046273 | A1 * | 4/2002 | Lahr et al. | 709/224 |
| 2002/0065938 | A1 * | 5/2002 | Jungck et al. | 709/246 |
| 2002/0150096 | A1 * | 10/2002 | Sjoblom | 370/389 |
| 2003/0179747 | A1 * | 9/2003 | Pyke et al. | 370/389 |
| 2004/0095894 | A1 * | 5/2004 | Eloranta et al. | 370/252 |
| 2004/0157629 | A1 | 8/2004 | Kallio et al. | |
| 2004/0158710 | A1 * | 8/2004 | Buer et al. | 713/160 |
| 2004/0199670 | A1 * | 10/2004 | Garfinkel | 709/246 |
| 2004/0255126 | A1 * | 12/2004 | Reith | 713/183 |
| 2005/0025061 | A1 * | 2/2005 | Pedersen et al. | 370/249 |
| 2005/0053073 | A1 * | 3/2005 | Kloth et al. | 370/395.41 |
| 2005/0083955 | A1 * | 4/2005 | Guichard et al. | 370/409 |
| 2005/0174937 | A1 | 8/2005 | Scoggins et al. | |
| 2006/0059163 | A1 | 3/2006 | Frattura et al. | |
| 2007/0094397 | A1 * | 4/2007 | Krelbaum et al. | 709/227 |

OTHER PUBLICATIONS

U.S. Appl. No. 10/947,729, entitled "Authentication Device Initiated Lawful Intercept of Network Traffic," filed Sep. 23, 2004.
M. Chiba et al., "Dynamic Authorization Extensions to Remote Authentication Dial In User Service (RADIUS)," 27 pages, Jul. 2003.
F. Baker et al., "Cisco Architecture for Lawful Intercept in IP Networks," 15 pages, Oct. 2003.

* cited by examiner

*Primary Examiner* — Fan Tsang
*Assistant Examiner* — Simon King
(74) *Attorney, Agent, or Firm* — Shumaker & Sieffert, P.A.

(57) ABSTRACT

Network traffic associated with a user is lawfully intercepted by mirroring data packets flowing to and from the user for which interception has been designated. A unique packet structure enables analysis of mirrored data packets of any network type. In one implementation, a packet structure comprises routable packets that encapsulate the mirrored packet stream. The routable packet structure may be formed by prepending a correlation header to each mirrored packet. The correlation header includes a routing header to allow the mirrored packets to be transportable across the public Internet. In addition, an intercept header may be embedded within the correlation header to easily support various analyzer-specific implementations. The intercept header may include a version field that is extensible for the various analyzer implementations.

50 Claims, 14 Drawing Sheets

PACKET STRUCTURE FOR MIRRORED TRAFFIC FLOW

TECHNICAL FIELD

The invention relates to computer networks and, more particularly, to analyzing traffic flow within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are communicated according to a communication protocol that defines the format of the packet. A typical packet, for example, includes a header carrying source and destination information, as well as a payload that carries the actual data. The de facto standard for communication in conventional packet-based networks, including the Internet, is the Internet Protocol (IP).

A system administrator or other user often makes use of a network analyzer to monitor network traffic. In general, a network analyzer is a tool that captures data from a network and presents the data to the user. The network analyzer typically allows the user to browse the captured data, and view summary and detail information for each packet. Accordingly, the user can view the network traffic flowing between devices on the network. Many conventional network analyzers, such as NetFlow, NeTraMet and FlowScan, use software applications to collect traffic flow information.

The analyzer typically monitors and collects packets having routing information that matches criteria specified by the system administrator. The system administrator may specify, for example, source and destination Internet Protocol (IP) addresses, source and destination port numbers, protocol type, type of service (ToS) and input interface information. The analyzer typically collects packets matching the specified criteria, and constructs flow analysis diagrams.

In some cases, a Law Enforcement Agency (LEA) may require the system administrator to mirror network traffic flowing to and from a designated network user. The original network traffic is routed across the network as usual while a mirrored version of the network traffic is forwarded for analysis. The term "lawful intercept" is used to describe the process by which LEAs conduct electronic surveillance of packet-based communications as authorized by a judicial or administrative order. Increasingly, legislation and regulations are being adopted that require public and private service providers to support authorized electronic surveillance. This increase is due in part to the increased use of computer networks for real-time voice communications using, for example, Voice over IP (VoIP).

Conventionally, lawful intercept of a network service, such as VoIP, has been enabled, managed, and monitored at a command line interface presented by a network device providing the network service. This technique may become difficult as the number of network services and respective devices increase. In addition, the system administrator may have difficulty predicting where a mobile network user will log in and access a particular service, thereby increasing the difficulty in enabling the lawful intercept. Moreover, conventional techniques for activating lawful intercept may not work well in environments where users login and logout frequently.

An additional challenge associated with the lawful interception of a network service is that the mirrored data packet streams resulting from the interception are often specific to the type of network in which the mirroring occurs. This makes it difficult to forward the mirrored streams to remote sites for analysis. As a result, it is often difficult to separate the interception point from the analysis point.

SUMMARY

In general, the invention relates to techniques for lawfully intercepting network traffic associated with a user and, in particular, initiating lawful intercept with a device associated with the authentication of the user, i.e., an "authentication device." As described herein, the authentication device communicates with a network service device, such as an edge router, providing network access or other services to the user to enable and disable monitoring of the network user. The authentication device may, for example issue requests to the network service device upon authenticating the network user during login or at any time while the network user's session is in progress.

The techniques may utilize a unique packet structure to enable analysis of mirrored data packets of any network type. In particular, a unique packet structure is described in which routable packets are formed that encapsulate the mirrored packet stream. These routable packets allow the encapsulated mirrored packet stream to easily be forwarded through a "best effort" network, such as the Internet, regardless of the particular type of interface used to mirror the network traffic.

In one embodiment, a method comprises intercepting packets of a network flow associated with a network user. The method further comprises forming routable packets that contain the intercepted packets, and forwarding the routable packets to an analyzer.

In another embodiment, the invention is directed to a network device comprising a mirroring module that intercepts packets of a network flow associated with a network user. The mirroring module then outputs to an analyzer routable packets that contain the intercepted packets.

In another embodiment, a network device comprises a mirroring module that intercepts packets of a network flow associated with a network user, and forms routable packets that contain the intercepted packets. The mirroring module forms each of the routable packets to include a header. The header comprises a destination field, an interception identifier field, a version field, and an account session field. The destination field identifies a network address associated with an analyzer. The interception identifier field identifies the network user. The version field includes analyzer-specific information. The account session field identifies an interface of the network device from which the packets were intercepted.

In a further embodiment, a computer readable medium comprises a packet generated by an intercept device from a network flow associated with a network user. The packet comprises a destination field, an interception identifier field, a version field, and an account session field. The destination field directs a router to forward the packet to an analyzer. The interception identifier field identifies the network user. The version field controls analysis of the packet by the analyzer. The account session field identifies an interface of the network device from which the packets were intercepted.

In another embodiment, a computer-readable medium comprises instructions. The instructions cause a programmable processor to intercept packets of a network flow associated with a network user. The instructions further cause the programmable processor to form routable packets that contain the intercepted packets, and forward the routable packets to an analyzer.

In another embodiment, a method comprises communicating intercept information and analysis information from a network authentication device to an intercept device. The method further comprises mirroring packets associated with a network user at the intercept device in accordance with the intercept information. The method also includes embedding the analysis information within the mirrored packets, and forwarding the mirrored packets from the intercept device to an analyzer.

In a further embodiment, a system comprises a Layer 2 Tunneling Protocol (L2TP) Access Concentrator (LAC) and a L2TP network server (LNS). The LAC is coupled to a client device associated with a user. The LNS terminates an L2TP tunnel associated with the user to provide network access for the user. The LAC mirrors packets associated with the user and prepends a header to the mirrored packets to form routable packets.

The invention may provide one or more advantages. For example, initiating intercept with an authentication device, as described herein, may allow the configuration of lawful intercept to be automatic and external to the particular device, such as an edge router, currently providing network services to the user. The authentication device may service, for example, a plurality of edge routers in one or more service provider networks. In this way, lawful intercept may be initiated and performed without prior knowledge of the particular network service device where the designated network user will access the network. In this regard, the described interception scheme may be effective for monitoring a mobile network user.

Furthermore, lawful intercept may be dynamically initiated by the authentication device at any time during the designated network user's session, not just at the time of authentication. This may be advantageous in environments where network users may be logged in for extended periods of time, which is typical for most broadband services such as digital subscriber line (DSL) and cable.

Moreover, by utilizing a generalized routable packet structure to encapsulate mirrored traffic, the techniques may allow intercepted network traffic to be transported through one or more networks for remote analysis regardless of the type of interface at which the traffic was intercepted. In other words, the techniques may allow the point of interception to be separated from the point of analysis. This may be useful, for example, in situations where user access is actually terminated at a network device remote from the user, e.g., situations where users are provided network access via a tunneling protocol, such as the Layer 2 Tunneling Protocol (L2TP). In this situation, the techniques described herein may allow L2TP session traffic to be intercepted and mirrored close to the user's domain, e.g., at an L2TP Access Concentrator (LAC). Mirroring at the LAC instead of at the L2TP network server (LNS) may provide several advantages, such as eliminating difficulties that may arise when the LNS is under a different network service provider than the LAC.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
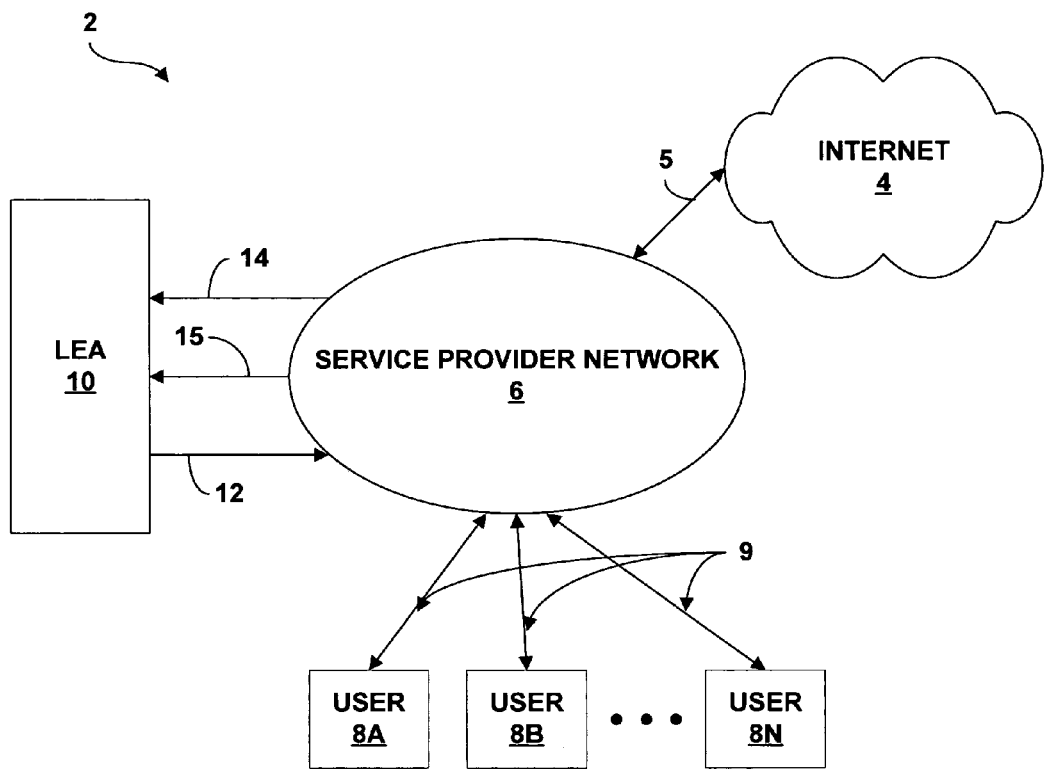
FIG. 1 illustrates an exemplary system in which a service provider network provides lawful interception of network traffic associated with a network user in accordance with the principles of the invention.

FIG. 1 illustrates an exemplary lawful intercept system 2 in which a service provider network 6 provides lawful interception of network traffic associated with at least one of users 8A-8N (hereinafter, "users 8"). A law enforcement agency ("LEA") 10 designates one or more of users 8 for network traffic monitoring and provides service provider network 6 with intercept subject information related to the designated users via handover interface 12. Typically, a legal court order must be granted to LEA 10 prior to requesting an operator of service provider network 6 to enable lawful intercept on the designated users.

In accordance with the principles of the invention, the lawful intercept is initiated within service provider network 6 by an authentication device (not shown in FIG. 1), which provides authentication of users 8 during login to service provider network 6. For example, an authentication device included in service provider network 6 may authenticate login information provided by users 8 to enable access to Internet 4. Users 8 may be connected to service provider network 6 via respective broadband links 9, such as those associated with a cable or digital subscriber line (DSL) service. Upon authenticating one of users 8 designated for lawful intercept, the authentication device communicates with one or more intercept devices (e.g., edge routers) within service provider network 6 to initiate the lawful intercept of one or more network packet streams associated with the designated user. The authentication device may initiate interception either at authentication of the designated one of user 8 during login or at any time while the designated user's session is in progress.

Once lawful intercept is enabled for the designated one of users 8, service provider network 6 allows mirroring of data packet streams flowing to and from the designated user via Internet link 5. The mirrored packets are forwarded to a specific data analyzer (not shown in FIG. 1), which may reside within or be remote to service provider network 6. Intercept related information (IRI), e.g., authentication device accounting details, may also be forwarded to the analyzer. For example, the accounting details may include event type, (e.g., Access Accept or Remote Authentication Dial-In User Service (RADIUS) request), access type, (e.g., Dial-Up, DSL, or local area network), username, user IP address, bytes transmitted, bytes received by user, and the like. In some embodiments, a specific customer or local jurisdiction (e.g., country or state) of LEA 10 may require additional accounting details and/or other information to be forwarded to the analyzer. The analyzer may then hand over the IRI and the mirrored packet analysis information to LEA 10 via handover interfaces 14 and 15, respectively.

In the illustrated embodiment of FIG. 1, it is assumed for purposes of illustration that the analyzer is located within service provider network 6. In other embodiments, the analyzer may be remotely located, e.g., within a different service provider network. In that case, as described in further detail below, the mirrored packet stream may be encapsulated in a unique packet structure that enables routing and analysis of mirrored packets of any network type. The unique packet structure may form "routable" packets to allow the encapsulated mirrored packet stream to easily be forwarded through a "best effort" network, such as Internet 4, regardless of the particular type of interface used to mirror the network traffic. For example, the intercepted packet stream may conform to the second layer (L2) of the Open System Interconnection (OSI) model. The intercept device may form the routable packets by associating forwarding information for the analyzer with each intercepted L2 packet to form packets that conform to a layer higher than the second layer of the OSI model, e.g., the third layer (L3) of the OSI model.

The term "packet" is used herein to generally describe a unit of data communicated between resources in conformance with a communication protocol. The principles of the invention may be readily applied to a variety of protocols, such as the Transmission Control Protocol (TCP), the User Datagram Protocol (UDP), the Internet Protocol (IP), Asynchronous Transfer Mode (ATM), Frame Relay, and the like. Accordingly, "packet" is used to encompass any such unit of data, and may be interchanged with the term "cell," or other similar terms used in such protocols to describe a unit of data communicated between resources within the network.

Figure 2:
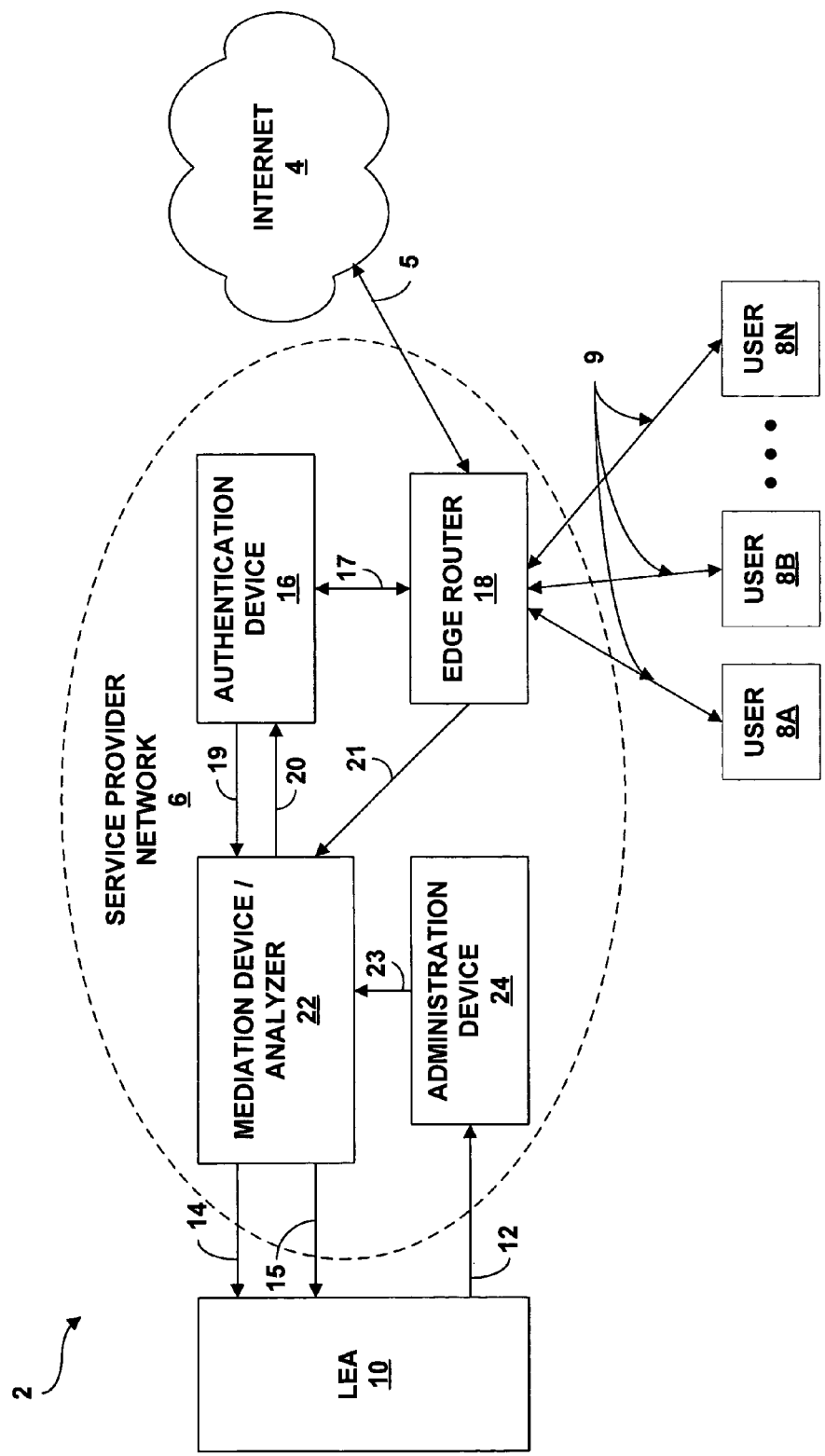
FIG. 2 is a block diagram illustrating the exemplary embodiment of the lawful intercept system from FIG. 1 in greater detail.

FIG. 2 is a block diagram illustrating one exemplary embodiment of lawful intercept system 2 from FIG. 1 in greater detail. In the embodiment shown in FIG. 2, service provider network 6 includes an authentication device 16, an edge router 18, a mediation device/analyzer 22, and an administration device 24. In other embodiments, mediation device/analyzer 22 may be separate devices, combined with administration device 24, authentication device 16 and/or edge router 18, or any combination thereof. Furthermore, authentication device 16, administration device 24 and mediation device/analyzer 22 may be located, in whole or in part, in other service provider networks.

Users 8 communicate login information to edge router 18 via broadband links 9. Edge router 18 couples service provider network 6 to Internet 4 and facilitates the transmission of data to and from Internet 4 over link 5. Edge router 18 maintains routing information that describes available routes between service provider network 6 and Internet 4, and forwards packets between users 8, service provider network 6 and Internet 4. In particular, upon receiving an incoming data packet, edge router 18 examines header information within the packet to identify the destination for the packet. Based on the header information, edge router 18 accesses the routing information, selects an appropriate route for the packet, and forwards the packet accordingly. Edge router 18 may include broadband remote access server (BRAS) capabilities to facilitate login authentication between users 8 and edge router 18.

Service provider network 6, and more particularly authentication device 16, stores data that defines attributes, e.g., an access profile and associated information, for users 8. For example, authentication device 16 may associate a username and password with a defined bandwidth allocation, latency, and error rate. In the case where LEA 10 designates one of users 8 for lawful interception, authentication device 16 stores intercept information with the attributes for the designated user. When receiving an access request by any of users 8, edge router 18 queries authentication device 16 to obtain user authentication and associated attributes, such as any available quality of service (QoS) information and intercept information. In this manner, edge router 18 may retrieve user attributes from a centralized location external to edge router 18, and forward data flows to and from users 8 in accordance with the retrieved information.

Edge router 18 sends an authentication request via authentication interface 17 to authentication device 16. The authentication request includes username and password information for one of users 8. Authentication device 16 authenticates the username and password and retrieves user attributes. Authentication device 16 then sends edge router 18 an authentication response over authentication interface 17. The authentication response enables the authenticated user to access Internet 4. In some cases, authentication device 16 may also send an intercept request to edge router 18 upon authentication of one of users 8 designated for traffic monitoring by LEA 10. In other cases, authentication device 16 may dynamically request lawful intercept of one of users 8 designated by LEA 10 at any time during the designated user's session. This may be advantageous in environments where network users may be logged in for extended periods of time, which is typical for most broadband services, such as DSL and cable.

LEA 10 designates at least one of users 8 and uses handover interface 12 to send intercept subject information related to the designated user to administration device 24. Administration device 24 converts the intercept subject information to network-identifiable information. Administration device 24 then sends the network-identifiable information over administration interface 23 to mediation device/analyzer 22 to enable intercept on the designated one of users 8. Administration device 24 may also provide other information, e.g., duration of intercept and type of intercept.

Mediation device/analyzer 22 provisions authentication device 16 via configuration interface 20 to request lawful intercept of the designated user's network traffic. Mediation device/analyzer 22 sends the intercept information to authentication device 16 to configure the designated user's attributes, e.g., access profile. Mediation device/analyzer 22 also provides address and port information for the analyzer.

If the LEA designated user is not logged in edge router 18 at the time authentication device 16 receives the intercept information, authentication device 16 may wait for the designated user to login. When authentication device 16 receives an authentication request from edge router 18 for the designated one of users 8, authentication device 16 sends an intercept request along with the authentication response to edge router 18. If the LEA designated user is logged in edge router 18 at the time authentication device 16 receives the intercept information, authentication device 16 dynamically sends an intercept request to edge router 18. Authentication device 16 may send the unsolicited intercept request at any time during the designated user's session.

In addition, authentication device 16 may send an intercept deactivation request to edge router 18 based on deactivation information from LEA 10. As described above, administration device 24 translates deactivation subject information from LEA 10 into network-identifiable information. Mediation device/analyzer 22 receives the translated information and sends deactivation information to authentication device 16 to reconfigure the designated user's attributes.

Upon receipt of an intercept request from authentication device 16, edge router 18 enables mirroring of some or all data packets flowing to and from the designated user. Edge router 18 mirrors the user's network traffic until the user logs off or an intercept deactivation request is received from authentication device 16. Edge router 18 continues to route the original data packets as specified. The mirrored data packet stream is sent to mediation device/analyzer 22 via analysis interface 21.

Mediation device/analyzer 22 receives the mirrored data packet stream from edge router 18 over analysis interface 21 and IRI from authentication device 16 over IRI interface 19. The IRI may include authentication device accounting details and associated records relating to a physical location or other information associated with a designated user. Mediation device/analyzer 22 analyzes the received packet stream and generates mirrored packet analysis information. Mediation device/analyzer 22 sends the IRI and the mirrored packet analysis information to LEA 10 via handover interfaces 14 and 15, respectively. In some cases, mediation device/analyzer 22 translates the analyzed data into a format required by the local jurisdiction (e.g., country or state) of LEA 10 prior to handing the data over to LEA 10.

Figure 3:
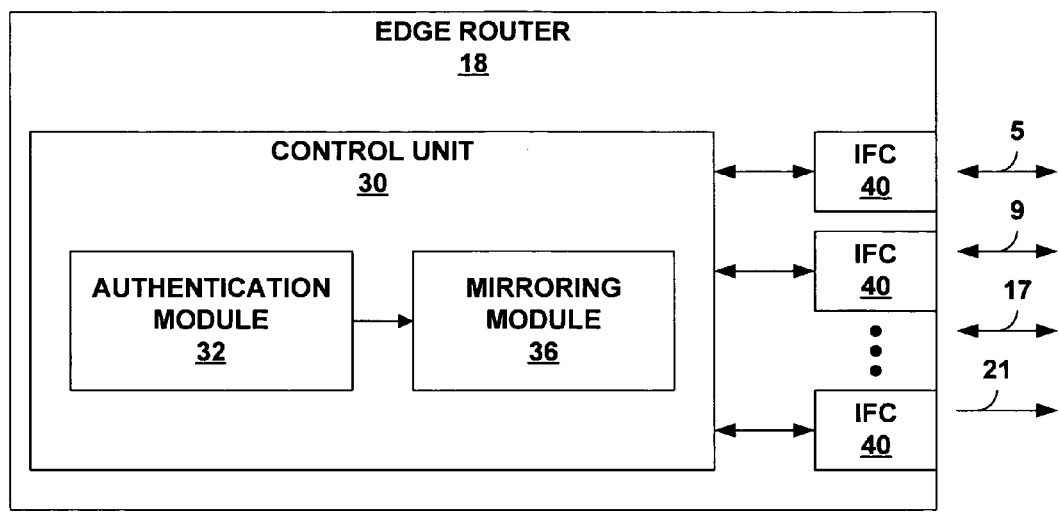
FIG. 3 is a block diagram illustrating an exemplary embodiment of an edge router from the lawful intercept system.

FIG. 3 is a block diagram illustrating an exemplary embodiment of edge router 18 (FIG. 2) of lawful intercept system 2 in greater detail. In the exemplary embodiment, edge router 18 comprises a control unit 30 that includes an authentication module 32 and a mirroring module 36. Edge router 18 further comprises interface cards (IFCs) 40 that receive and send packets. IFCs 40 are typically coupled to physical links via a number of interface ports. For exemplary purposes, IFCs 40 are shown in FIG. 3 as coupled to Internet link 5, broadband links 9, authentication interface 17, and analysis interface 21 of FIG. 2.

In general, edge router 18 routes packets between network users 8, service provider network 6 and Internet 4. Edge router 18 may include BRAS capabilities, which facilitate acceptance and authentication of user login information from users 8. IFCs 40 provide login information from users 8 to authentication module 32. Authentication module 32 sends the login information, e.g., a username and password, to authentication device 16 via IFCs 40. Authentication module 32 receives an authentication response from authentication device 16. Once the requesting user is authenticated, edge router 18 enables network access for the user via one of respective broadband links 9.

In some cases, authentication module 32 also receives an intercept request with the authentication response. Authentication module 32 forwards the intercept request to mirroring module 36. In other cases, mirroring module 36 may directly receive intercept requests from authentication device 16. This may occur, for example, after the user has been logged in and authenticated by edge router 18. Upon receiving an intercept request, mirroring module 36 captures some or all network traffic associated with the designated user from IFCs 40 and generates copies of the network traffic. In particular, edge router 18 generates mirrored data packet streams and forwards the mirrored data packet streams to mediation device/analyzer 22 via analysis interface 21 through IFCs 40.

Control unit 30 may intercept and mirror packets associated with the designated user in a variety of ways. For example, control unit 30 may buffer incoming packets associated with the designated user, and digitally copy each buffered packet to internally mirror the packets. Alternatively, control unit 30 may simply forward a duplicate of each intercepted packet to mediation device/analyzer 22 without digitally copying the intercepted packet.

The architecture of edge router 18 illustrated in FIG. 3 is shown for exemplary purposes only. Practice of the principles of the invention is not limited to this architecture. In other embodiments, edge router 18 may be configured in a variety of ways. In one embodiment, for example, control unit 30 and its corresponding functionality may be distributed within IFCs 40. In another embodiment, control unit 30 may include a routing engine that performs route resolution and maintains a routing information base (RIB), and a forwarding engine that performs packet forwarding based on a forwarding information base (FIB) generated in accordance with the RIB.

Control unit 30 may be implemented solely in software, or hardware, or may be implemented as a combination of software, hardware, or firmware. For example, control unit 30 may include one or more processors which execute software instructions. In that case, the various software modules of control unit 30, such as authentication module 32 and mirroring module 36, may comprise executable instructions stored on a computer-readable medium, such as computer memory or hard disk.

Figure 4:
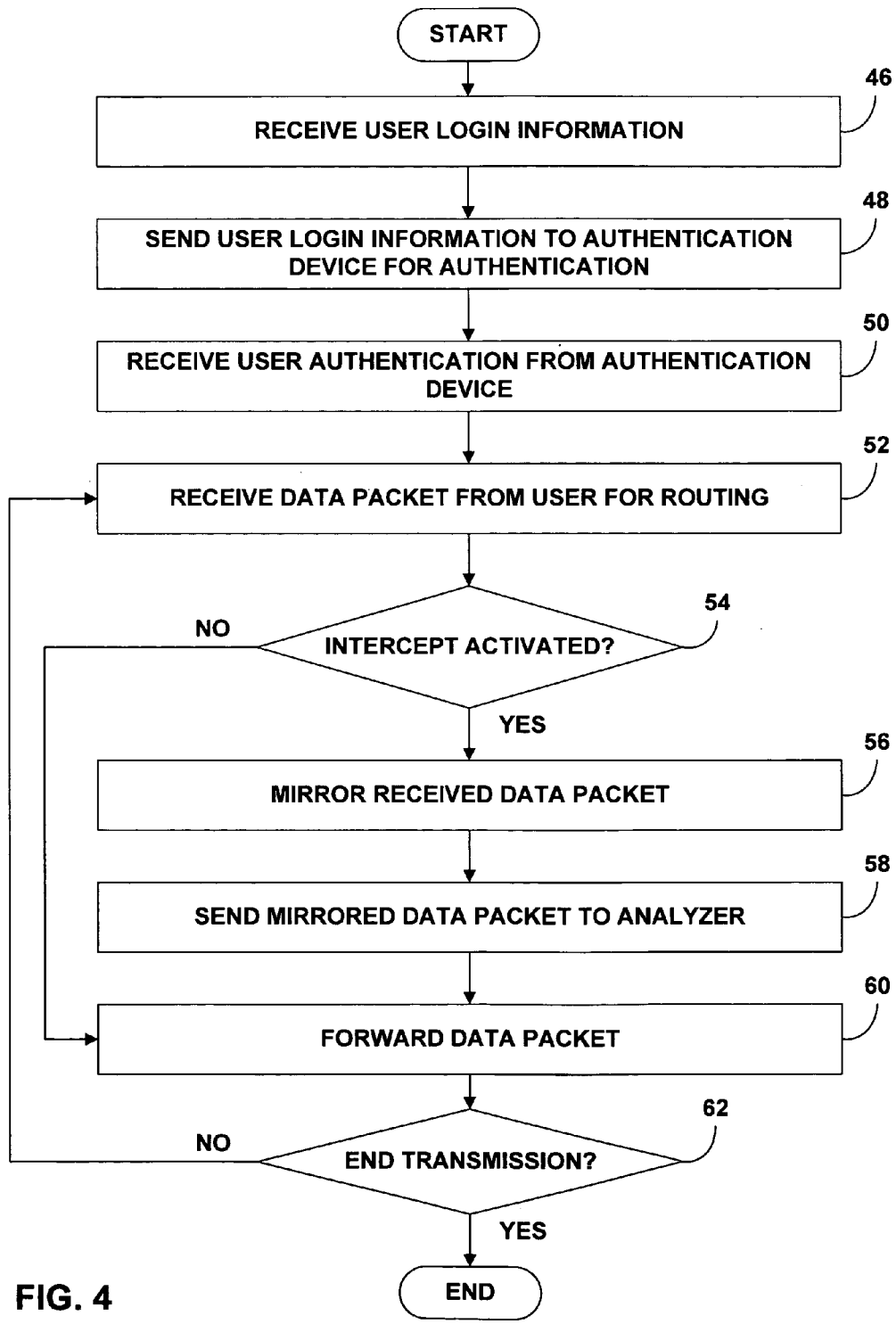
FIG. 4 is a flowchart illustrating exemplary operation of the edge router from FIG. 3.

FIG. 4 is a flowchart illustrating exemplary operation of edge router 18 from FIG. 3. Initially, edge router 18 receives login information via IFCs 40 from one of network users 8 (46). The login information is provided to authentication module 32 within control unit 30 of edge router 18. Authentication module 32 sends an authentication request including login information for the user, such as a username and password, to authentication device 16 via authentication interface 17 (48). Authentication device 16 uses the username and password to verify the user's subscription to service provider network 6 and retrieves user attributes and associated information. Authentication module 32 receives an authentication response, which includes acceptance or rejection of the user, from authentication device 16 (50).

Assuming the user was authenticated, edge router 18 begins receiving data packets for one or more network flows, i.e., packets streams, associated with the user (52). The network flows may be associated with a network service. For example, edge router 18 may receive VoIP flows originating from or destined to the authenticated user. Control unit 30 determines whether an intercept request has been received for the user (54). If the user attributes received during authentication of the user specified the activation of lawful intercept, mirroring module 36 mirrors the received data packet (56). The mirrored data packet is then sent to monitoring device/analyzer 22 via analysis interface 21 (58). Edge router 18 then forwards the original data packet in accordance with internally maintained routing information (60) once mirroring is complete.

If authentication module 32 did not receive an intercept request along with the authentication response, edge router 18 simply forwards the data packet (60). If the transmission has not completed (62), control unit 30 continues to receive the next data packets (52). Control unit 30 checks whether a dynamic intercept request has been received from authentication device 16 (54) during the designated user's session. If an intercept request has been received, mirroring module 35 mirrors the received data packet (56) and the mirrored data packet is sent to mediation device/analyzer 22 (58).

In either case, once the data packet is forwarded, control unit 30 checks if the transmission is ended (62). If the transmission is not over, edge router 18 receives the next data packet (52) and control unit 30 again checks if lawful intercept has been enabled (54). Authentication device 16 may request activate or deactivate lawful intercept at any time during the user's session. Therefore, control unit 30 continues to monitor this activation status while packets are received. This allows lawful intercept system 2 to achieve a high level of accuracy, which is often required by LEA 10.

Figure 5:
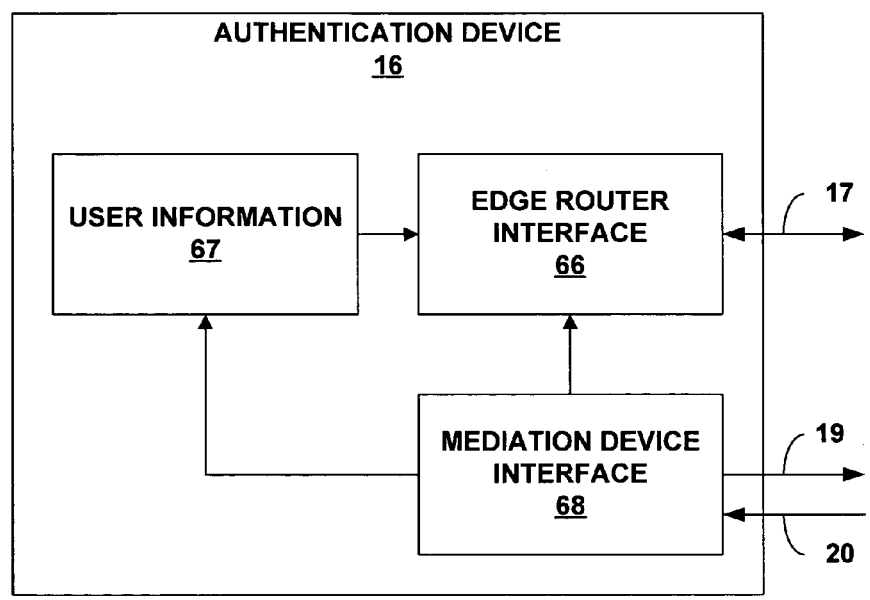
FIG. 5 is a block diagram illustrating an exemplary embodiment of an authentication device from the lawful intercept system.

FIG. 5 is a block diagram illustrating an example embodiment of authentication device 16 of lawful intercept system 2 in greater detail. In the exemplary embodiment, authentication device 16 comprises an edge router interface 66 and a mediation device interface 68. In some embodiments, authentication device 16 may comprise a Remote Authentication Dial-In User Service (RADIUS) server. Lawful intercept initiation may, for example, be integrated into an existing RADIUS server. This implementation may fit well in conventional BRAS environments since RADIUS servers are well integrated into many such environments. In this way, lawful intercept capabilities described herein may serve as add-on functionality rather than an architectural change to an existing service provider network.

Edge router interface 66 enables communication between authentication device 16 and edge router 18 via authentication interface 17. Edge router interface 66 receives authentication information, e.g., username and password information, from edge router 18. Authentication device 16 authenticates the user and accesses user information 67 to retrieve user attributes related to the user. Authentication device 16, for example, may maintain user information 67 as a centralized database of information for authorized users. The user attributes maintained with user information 67 may include intercept information, thereby identifying the users that LEA 10 has designated for lawful intercept.

Edge router interface 66 sends an authentication response to edge router 18 accepting or rejecting the authentication information. For authenticated users, edge router interface 66 includes an intercept request if the attributes associated with the users designate the users for lawful intercept.

Edge router interface 66 may also dynamically contact edge router 18 to request lawful intercept be enabled on an LEA designated user. The unsolicited request may be sent at any time during the designated user's session with service provider network 6. In other words, authentication device 16 may include additional functionality to enable unsolicited communication with another device, such as edge router 18.

Edge router interface 66 may also send an unsolicited deactivation request to edge router 18 to end lawful intercept for a designated user. Again, the deactivation request may be sent at any time during the user's session. If authentication device 16 receives the deactivation information at a time when the designated user is not logged in service provider network 6, the user's attributes may be reconfigured such that the next time the user logs in the intercept will not be enabled.

Mediation device interface 68 receives intercept information from mediation device/analyzer 22 via configuration interface 20. The intercept information includes identifying information for the user on which intercept is to be performed. The intercept information may also include intercept duration and type of intercept. Mediation device interface 68 stores the received intercept information to the designated user's attributes stored within user information 67. In that way, when authentication device 16 receives the designated user's login information for authentication, authentication device 16 can send an intercept request along with the authentication response via edge router interface 66. Mediation device interface 68 may also receive the intercept information at any time during the designated user's session. If the user is logged in when the intercept information is received, mediation device interface 68 provides the information to edge router interface 66, which prompts edge router interface 66 to dynamically send an intercept request to edge router 18.

Mediation device interface 68 also sends IRI, which may comprise authentication device accounting information and associated records related to a physical location or other information associated with the designated user, to mediation device/analyzer 22 via IRI interface 19. Mediation device/analyzer 22 uses the IRI for analysis of the mirrored data packets.

Figure 6:
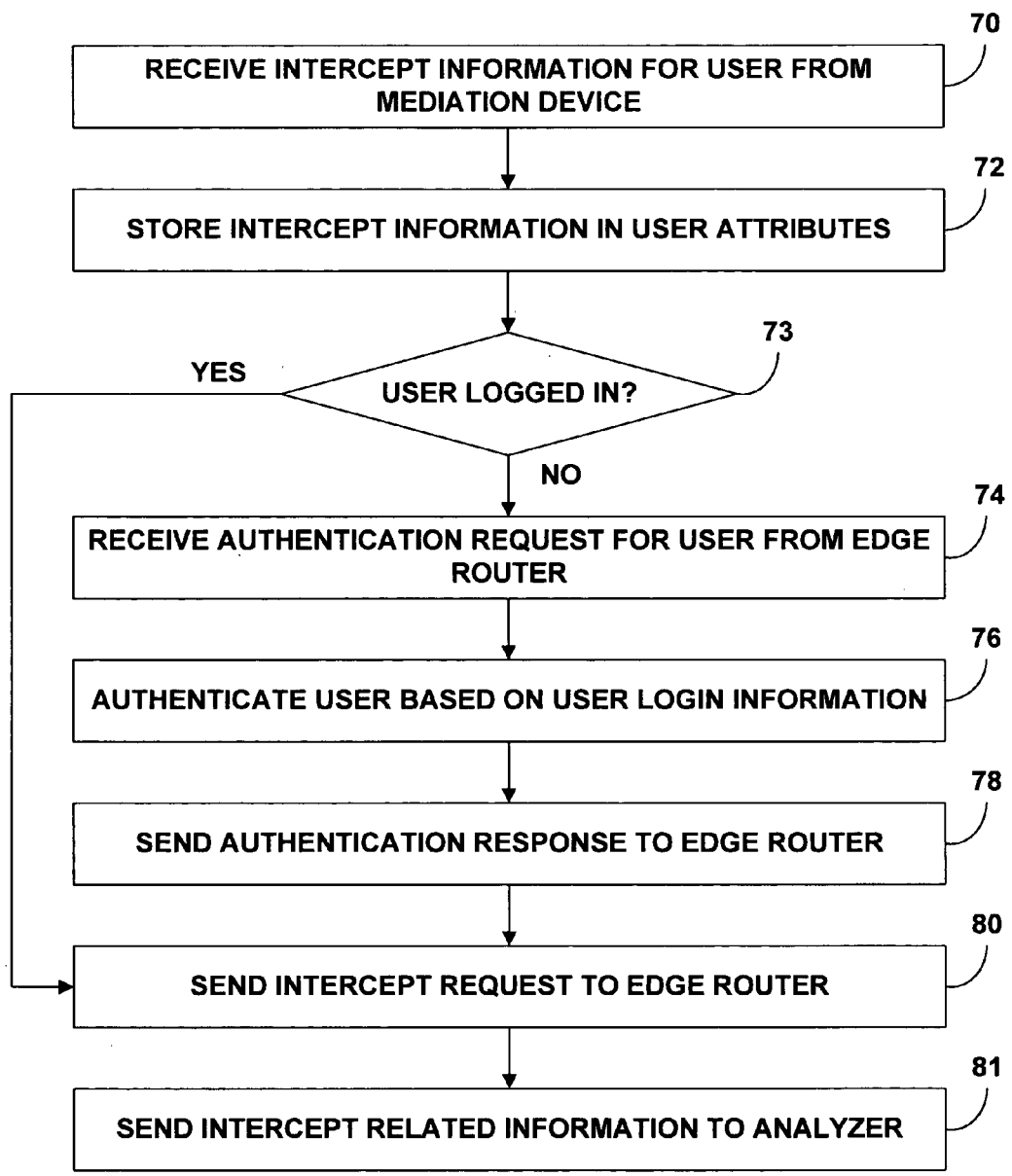
FIG. 6 is a flow chart illustrating exemplary operation of the authentication device from FIG. 5.

FIG. 6 is a flow chart illustrating exemplary operation of authentication device 16 in further detail. Mediation device interface 68, included within authentication device 16, receives intercept information for a user designated by LEA 10 from mediation device/analyzer 22 (70). Mediation device interface 68 stores the received intercept information within user information 67 as user's attributes (72).

Edge router interface 66, also included in authentication device 16, then determines whether the designated user is currently logged into edge router 18 (73). If the designated user is already logged in, edge router interface 66 sends an intercept request to edge router 18 (80). In that case, the intercept request is sent dynamically by edge router interface 66 upon mediation device interface 68 receiving the intercept information.

If the designated user is not logged in, authentication device 16 may wait until edge router interface 66 receives an authentication request from edge router 18 (74). The authentication request includes the designated user's login information. Authentication device 16 accesses user information 67 to authenticate the user based on the received user login information (76). User information 67 may be stored locally within authentication device 16 or remotely. Authentication device 16 also retrieves the user attributes, including the intercept information, from user information 67. Edge router interface 66 sends an authentication response to edge router 18 (78) enabling the designated user to access resources and services within Internet 4. In the event the user has been designated for lawful intercept, edge router interface 66 also sends an intercept request to edge router 18 (80). In this case, the intercept request may be included in the authentication response or sent as a separate communication.

Once the intercept request is sent to edge router 18, mediation device interface 68 sends intercept related information (IRI) to mediation device/analyzer 22. At any time mediation device interface 68 may receive deactivation information from mediation device/analyzer 22. The deactivation information is used to reconfigure the designated user's attributes. If the user is in session, mediation device interface 68 also forwards the information to edge router interface 66, which prompts a dynamic deactivation request to be sent to edge router 18. The deactivation request disables lawful intercept for the designated user by edge router 18.

Figure 7:
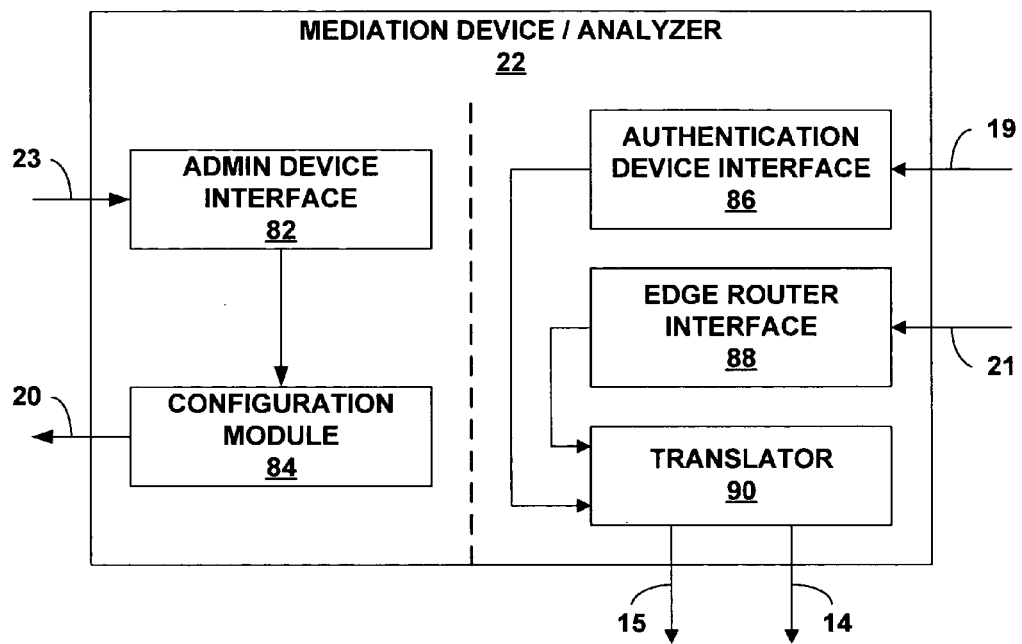
FIG. 7 is a block diagram illustrating an exemplary embodiment of a mediation device/analyzer from the lawful intercept system.

FIG. 7 is a block diagram illustrating an example embodiment of mediation device/analyzer 22 from lawful intercept system 2 in greater detail. In the embodiment illustrated in FIG. 7, functionality of a mediation device and an analyzer are integrated into mediation device/analyzer 22. In other embodiments, the mediation device and the analyzer may be two discrete devices. In some cases, the mediation device and the analyzer may be located in separate service provider networks.

The mediation device portion of mediation device/analyzer 22 comprises an administration device interface 82 and a configuration module 84. Administration device interface 82 facilitates communication with administration device 24 via administration interface 23. In particular, administration device interface 82 receives network-identifiable intercept information from administration device 24. The network-identifiable information has been converted from intercept subject information, which identifies a network user designated for lawful intercept by LEA 10.

Administration device interface 82 sends the network-identifiable information to configuration module 84. Configuration module 84 communicates with other devices within service provider network 6 to allow lawful intercept to be performed. As illustrated in FIG. 7, configuration module 84 sends intercept information to authentication device 16 via configuration interface 20. The intercept information configures the designated user's attributes stored by authentication device 16 to enable intercept of the user's network traffic. In this way, the mediation portion of mediation device/analyzer 22 may be viewed as a translator between high-level lawful intercept administration, e.g., operations performed by administration device 24, and lower level components, such as authentication device 16.

The analyzer portion of mediation device/analyzer 22 comprises authentication device interface 86, edge router interface 88 and translator 90. Authentication device interface 86 receives IRI from authentication device 16 via IRI interface 19. The received IRI may include authentication device accounting details and associated records related to a physical location of the designated user. Edge router interface 88 receives mirrored data packets from edge router 18 via analysis interface 21.

As the mirrored data and IRI traffic is received, the analyzer portion of mediation device/analyzer 22 may compress the data and eliminate any unwanted data. Mediation device/analyzer 22 then analyzes the mirrored data packets. Translator 90 receives the mirrored packet analysis information and the IRI. Translator 90 may translate the analysis information and the IRI into a format required by the local jurisdiction (e.g., country or state) of LEA 10. Translator device 90 hands over the translated versions of the mirrored packet analysis information and the IRI to LEA 10 via handover interfaces 14 and 15, respectively.

Figure 8:
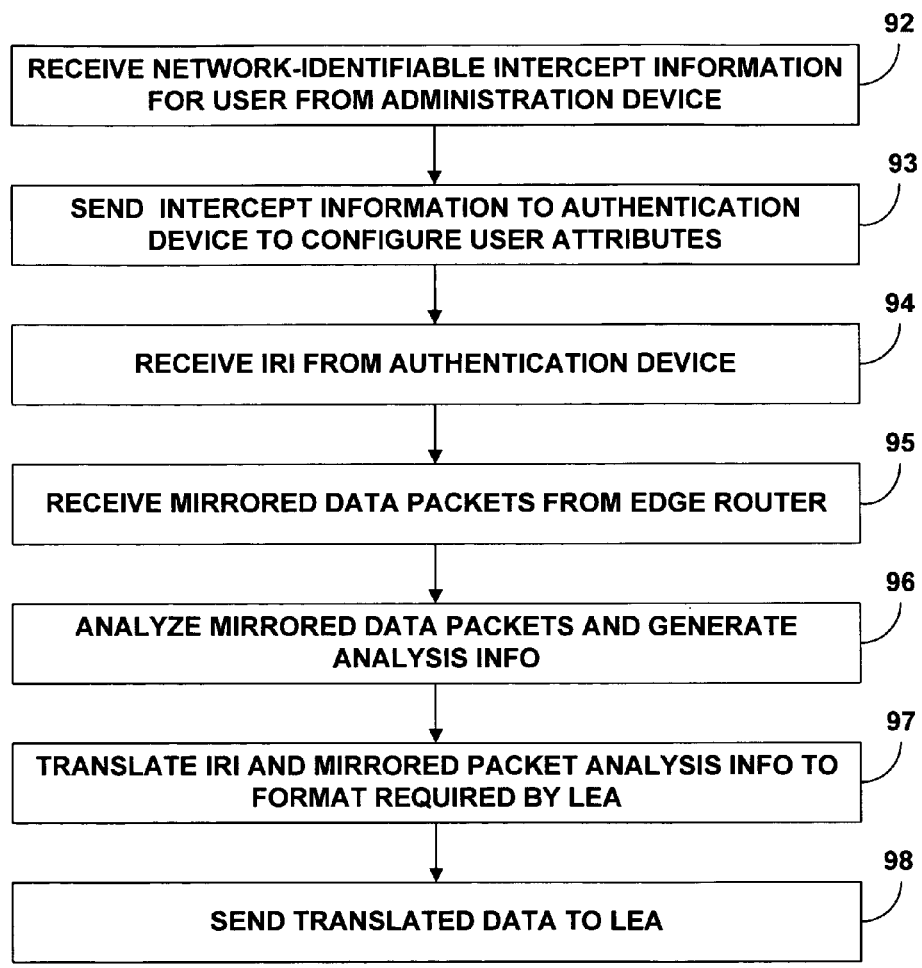
FIG. 8 is a flow chart illustrating exemplary operation of the mediation device/analyzer from FIG. 7.

FIG. 8 is a flow chart illustrating example operation of mediation device/analyzer 22 of FIG. 7. Administration device interface 82, included within the mediation device portion of mediation device/analyzer 22, receives network-identifiable intercept information from administration device 24 (92). The network-identifiable information identifies a network user designated by LEA 10 for lawful interception. The network-identifiable information is used by configuration module 84, also included within the mediation device portion, to configure authentication device 16. In particular, configuration module 84 sends the intercept information to authentication device 16 to configure the designated user's attributes to enable lawful intercept on the user (93).

Authentication device interface 86, included in the analyzer portion of mediation device/analyzer 22, receives IRI from authentication device 16 (94). Edge router interface 88, also included in the analyzer portion, receives mirrored data packets from edge router 18 (95). Mediation device/analyzer 22 then analyzes the received data and generates mirrored packet analysis information (96). In one embodiment, mediation device/analyzer 22 generates mirrored packets in accordance with the routable packet structure defined below.

Translator 90 translates the mirrored packet analysis information and the IRI into a format required by LEA 10 (97). Translator 90 then sends the translated mirrored packet analysis information and IRI to LEA 10 via handover interfaces 14 and 15, respectively (98).

Figure 9:
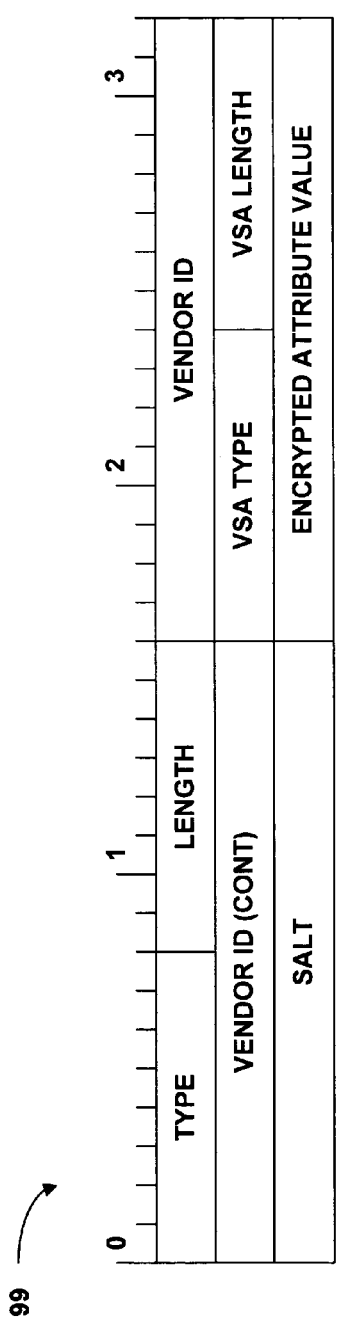
FIG. 9 illustrates a detailed RADIUS structure of an intercept attribute as a salt encrypted attribute on an Internet connection.
Figure 10:
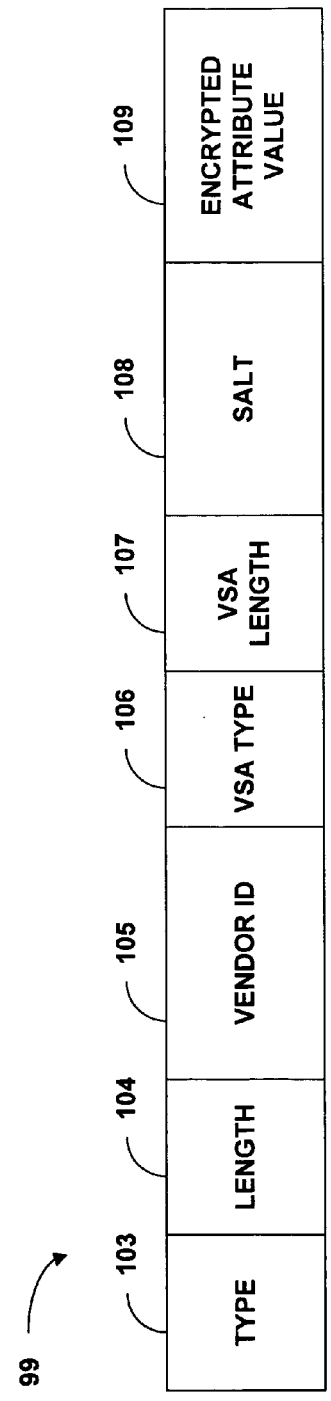
FIG. 10 illustrates a block structure for the RADIUS intercept attribute from FIG. 9.

FIGS. 9 and 10 illustrate lawful intercept attribute structures defined in authentication device 16 (FIG. 2) as transmitted over the Internet to enable edge router 18 (FIG. 2) to support authentication device initiated lawful intercept. The authentication device initiated mirroring described herein may be an extension of an authentication device initiated disconnect model. For example, a Change of Authorization feature explained in informational request for comment (RFC) 3576 entitled "Dynamic Authorization Extensions to a Remote Authentication Dial In User Service (RADIUS)," copyright July 2003, from the Internet Engineering Task Force (IETF), herein incorporated by reference, may be used to support the lawful intercept extension. Message codes defined in RFC 3576 may be used, such that the Change of Authorization request will include the lawful intercept attributes.

In the case of the authentication device initiated disconnect feature, a disconnect request is received by a disconnect application within edge router 18. Once the contents of the disconnect request are verified, the disconnect application requests disconnect for the user uniquely identified by an acct-session-id or a multi-session-id included with the disconnect request.

The disconnect model may be extended for lawful intercept as follows. Edge router 18 receives an intercept request from authentication device 16 during a user session. After validating the contents of the mirroring request, an authentication device initiated request application within edge router 18 extracts the lawful intercept attributes along with an acct-session-id, which uniquely identifies the user designated for lawful intercept. Through a callback mechanism, the lawful intercept attributes and authentication id are forwarded to a policy application, i.e., mirroring module 36, included in edge router 18. To configure mirroring on an L2TP session, the policy application may call its L2TP subcomponent to create and attach secure L2TP policies to the specified interface. To configure mirroring on an IP interface, the policy application may call its IP subcomponent to create and attach secure IP policies to the specified interface.

Similarly, authentication device 16 may initiate intercept deactivation. The disconnect application in edge router 18 will receive the mirroring disable request and after verifying the contents will notify the policy application to disable mirroring on the specified interface. The policy application may detach and delete the secure policy on this interface.

Each of the lawful intercept attributes includes identifiers that enable edge router 18 to understand the extension to the standard RADIUS attributes as, for example, described in RFC 2865 entitled "Remote Authentication Dial In User Service (RADIUS)," copyright June 2000, from the IETF, herein incorporated by reference. The Radius Authentication server (generically authentication device 16) conveys the lawful intercept attributes as vendor specific attributes as defined in RFC 2865. To insure that another device monitoring the Internet cannot determine the nature of these lawful intercept attributes, the attributes are salt encrypted similar to the Tunnel-Password attribute discussed in RFC 2868 entitled "RADIUS Attributes for Tunnel Protocol Support," copyright June 2000, from the IETF, herein incorporated by reference. The distinction between the Tunnel-Password attribute and the lawful intercept attributes discussed herein is that the lawful intercept attributes do not contain a "tag" field.

FIG. 9 illustrates a detailed RADIUS structure of an intercept attribute 99 as a salt encrypted attribute on an Internet connection. FIG. 10 illustrates a block structure for the RADIUS intercept attribute 99. Intercept attribute 99 includes a "type" field 103, a "length" field 104, a "vendor-id" field 105, a "vsa-type" field 106, a "vsa-length" field 107, a "salt" field 108, and an "encrypted-attribute-value" field 109. Type field 103 may have a value 26, which indicates intercept attribute 99 as a Vendor Specific Attribute (VSA). The value of length field 104 may vary depending on the entire length of intercept attribute 99 including any headers. Vendor-id field 105 comprises a vendor specific identification number. As an example, vendor-id field 105 may have a value 4874 for Juniper Networks™, Inc. of Sunnyvale, Calif. Vendor-id field 105 may have a different value for Cisco Systems™, Inc. of San Jose, Calif., for example.

Vsa-type field 106 allows edge router 18 (FIG. 2) to identify the VSA received from authentication device 16 and respond accordingly. Vsa-type field 106 has a value 58 for "lawful intercept action", a value 59 for "lawful intercept identifier", a value 60 for "mediation device IP address", and a value 61 for the "mediation device UDP/IP port number". Vsa-length field 107 may vary depending on the length of the vendor specific attribute value including only vsa-type 106, vsa-length 107, salt 108, and encrypted-attribute-value 109 fields. Salt field 108 comprises the salt value as discussed in RFC 2868. Encrypted-attribute-value field 109 has a value of the lawful intercept attribute after salt encryption.

The lawful intercept action (vsa-type 58) is a 4-octect field indicating whether mirroring should be enabled or disabled on edge router 18. A value 0 requests edge router 18 to stop monitoring traffic of a designated user. A value of 1 requests edge router 18 to start monitoring traffic of a designated user on the network. A value of 2 is used to confuse message hackers. When a value of 2 is received, edge router 18 will not perform any lawful intercept related configuration.

Figure 11:
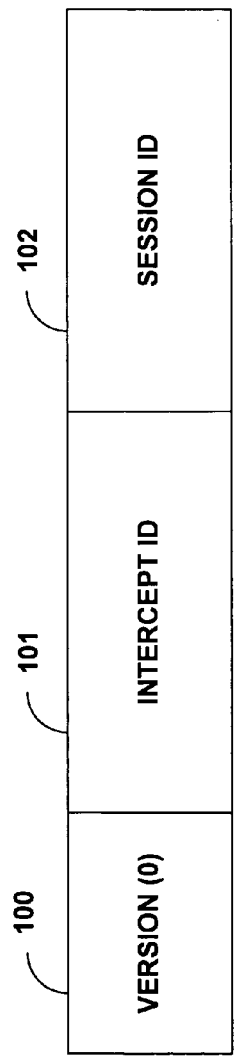
FIGS. 11 and 12 illustrate an encoding format for the lawful intercept identifier attribute.
Figure 12:
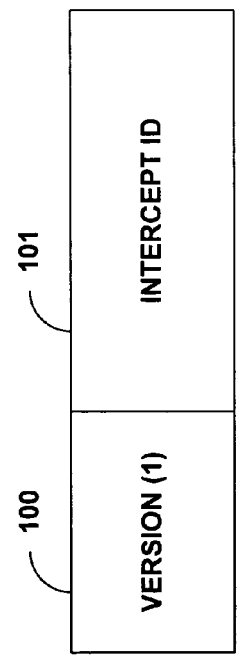

FIGS. 11 and 12 illustrate encoding formats for the lawful intercept identifier (vsa-type 59), which is a string field containing an intercept id 101 and/or a session id 102. One example format of the lawful intercept identifier string, as illustrated in FIG. 11, includes 8 bytes, i.e., two words, in which the first two most significant bits 100 in the first word (4 bytes) has a value 0x0 (Decimal value 0). The value 0x0 causes edge router 18 to expect exactly two words in the lawful intercept identifier attribute. The configuration will fail if more or less data is present. The lower 30 bits of the first word contains intercept id 101 and the second word (32 bits) contains session id 102. Intercept id 101 and session id 102 values may be required to be presented in a predetermined order. This format allows session id 102 to be specified in authentication device 16 rather than deducing it from the acct-session-id.

Another example format of the lawful intercept identifier string, as illustrated in FIG. 12, includes 4 bytes, i.e., 1 word, in which the first two most significant bits 100 in the word has a value 0x1 (Decimal value 1). The value 0x1 causes edge router 18 to expect exactly one word in the lawful intercept identifier attribute. The configuration will fail if more or less data is present. The lower 30 bits of the word contains intercept id 101. Edge router 18 will choose the lower 32 bits of the acct-session-id as the session id. This format allows correlation between the intercept header and a user designated for lawful intercept.

The mediation device IP address (vsa-type 60) is a 4-octect field containing the IPv4 (IP version 4) address of lawful intercept mediation device 22. The mediation device UDP port number (vsa-type 61) is a 4-octect field containing the IPv4 UDP port number of the monitoring application included in lawful intercept mediation device 22. Currently, only the lower 2 octets of the mediation device UDP port number attribute are used. In this case, the first two octets should have a value 0.

In the case where lawful intercept is initiated by authentication device 16 upon login of a designated user, additional attributes will be sent to edge router 18 with a response to the authentication request. The additional attributes include the lawful intercept identifier (VSA #59), the lawful intercept action (VSA #58) set to a value of 1, the mediation device IP address (VSA #60), and the mediation device UDP port number (VSA #61).

In the case where lawful intercept is initiated during a designated user's session, the additional attributes will be included in an update message set by authentication device 16 to edge router 18. An acct-session-id will be included along with the attributes listed for the previous case. Additionally, in the case where lawful intercept is disabled during a designated user's session, authentication device 16 includes an acct-session-id and the lawful intercept action (VSA #58), set to a value of 0, in the update message set to edge router 18.

Figure 13:
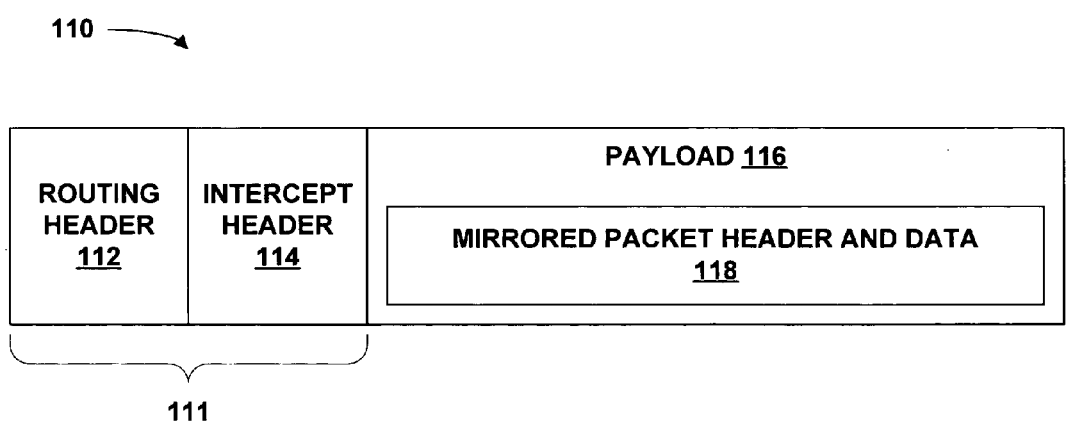
FIG. 13 illustrates an exemplary mirrored packet structure formed as a routable packet in accordance with the principles of the invention.

FIG. 13 illustrates one embodiment of a mirrored packet structure 110 utilized by mediation device/analyzer 22. As further described, packet structure 110 provides a generalized, routable packet structure that enables analysis of mirrored data packets of any network type, e.g., Multi Protocol Label Switching (MPLS) and Asynchronous Transfer Mode (ATM). More specifically, packet structure 110 defines routable packets that encapsulate the mirrored packet stream. These routable packets allow the encapsulated mirrored packet stream to easily be forwarded through a "best effort" network, such as Internet 4 (FIG. 1), regardless of the particular type of interface used to mirror the network traffic. For example, service provider network 6 may utilize mirrored packet structure 110 to generate and forward a mirrored packet stream to a remote packet analyzer, e.g., a packet analyzer located under another service provider network.

In the embodiment illustrated in FIG. 13, mirrored packet structure 110 includes a correlation header 111 prepended to mirrored packet header and data 118. Packet structure 110 may be viewed as defining a fourth layer (L4) packet structure in which mirrored packet header and data 118 is encapsulated as third layer (L3) data. The L3 data is fed into the L4 packet structure as a payload 116. Encapsulating mirrored packet header and data 118 as L3 data enables network traffic to be monitored at any point in the network and easily forwarded to an analyzer. An analyzer may collect data packets of any network type encapsulated in packet structure 110, and differentiate between the types of data packets.

In one embodiment, correlation header 111 includes a routing header 112 and an intercept header 114. Routing header 112 allows mirrored packet data 118 to be transportable across a network, such as Internet 4. For example, routing header 112 may be a User Datagram Protocol/Internet Protocol (UDP/IP) header. Intercept header 114 may contain information identifying a specific analyzer version. Intercept header 114 is embedded within correlation header 111 to support various analyzer-specific implementations. Correlation header 111 is prepended to mirrored packet header and data 118 in a network service device, such as an edge router, prior to sending mirrored packet header and data 118 to the analyzer. LEA 10 may provide routing header 112 and intercept header 114. Headers 112, 114 may be configured in authentication device 16 and stored along with user attributes and other mirroring information associated with a user designated for lawful intercept by LEA 10.

Utilizing mirrored packet structure 110 to encapsulate mirrored traffic allows intercepted network traffic to be transported through one or more networks for remote analysis regardless of the type of interface at which the traffic was intercepted. In other words, the techniques may allow the point of interception to be separated from the point of analysis. This may be useful, for example, in situations where user access is actually terminated at a network device remote from users 8, e.g., situations where the users are provided network access via a tunneling protocol, such as the Layer 2 Tunneling Protocol (L2TP). In this situation, the techniques described herein may allow L2TP session traffic to be intercepted and mirrored close to the user's domain, e.g., at an L2TP Access Concentrator (LAC) within service provider network 6. Mirroring at the LAC instead of at the L2TP network server (LNS) may provide several advantages, such as eliminating difficulties that may arise when the LNS is under a different network service provider than the LAC.

Figure 14:
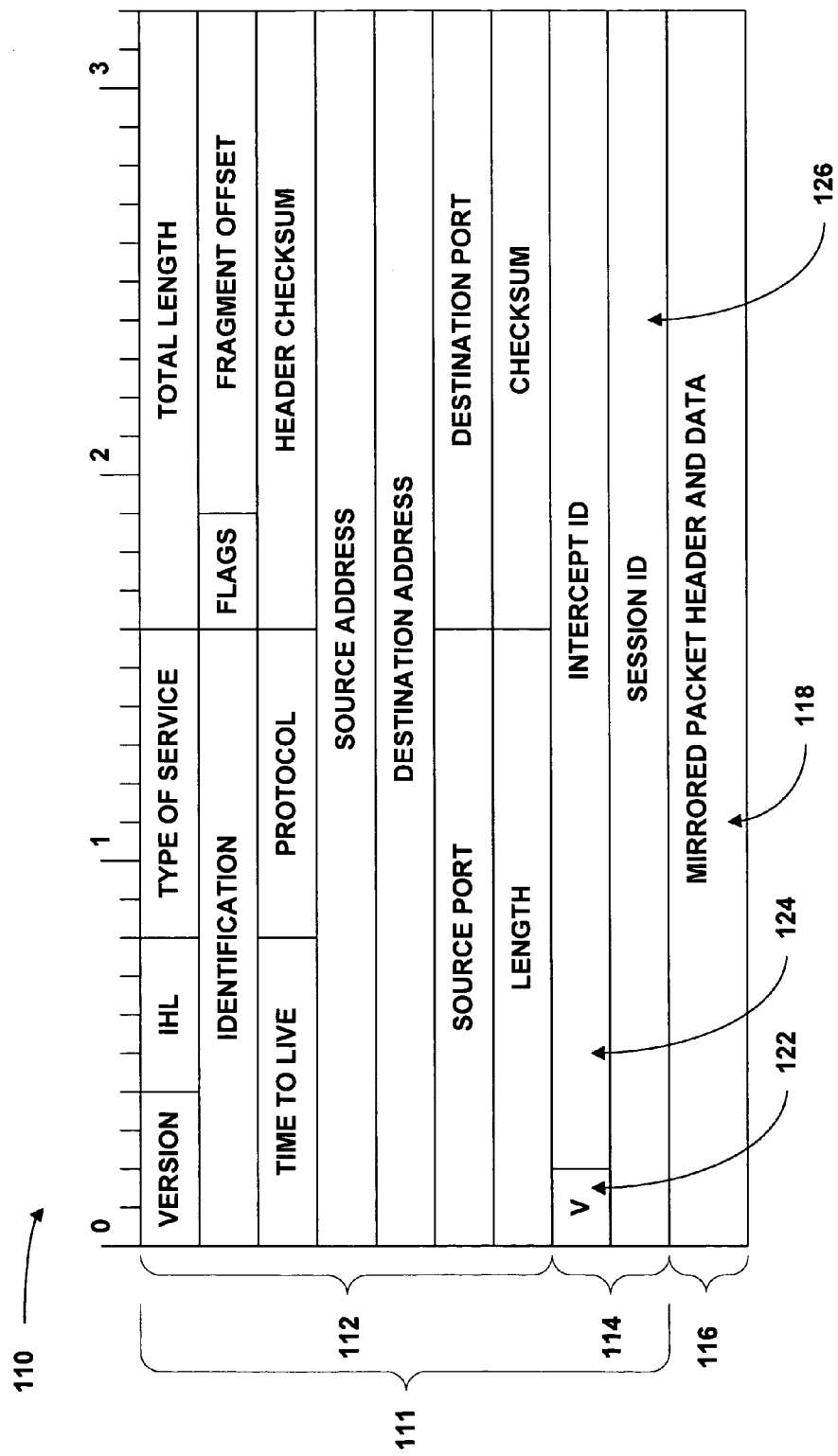
FIG. 14 illustrates one embodiment of the mirrored packet structure from FIG. 13.

FIG. 14 illustrates one embodiment of mirrored packet structure 110 of FIG. 13 in greater detail. In the illustrated embodiment, packet structure 110 includes correlation header 111 and payload 116. Payload 116 encapsulates mirrored packet header and data 118. Correlation header 111 includes routing header 112 and intercept header 114. Routing header 112 includes several data packet information fields, such as total length and protocol. Routing header 112 also includes fields defining source and destination addresses and ports. As an example, routing header 112 may be a UDP/IP header. Intercept header 114 embedded within the prepended correlation header 111 includes a version field 122, an intercept id field 124, and a session id field 126.

Intercept id 124 is included with an intercept request from authentication device 16 to edge router 18 or other network service device. Intercept id 124 provides a unique identifier associated with one of users 8 designated for lawful intercept. Intercept id 124 may be provided by LEA 10, and may be blindly inserted in packet structure 110 by edge router 18 for use by mediation device/analyzer 22. In other words, authentication device 16 and edge router 18 may treat intercept id 124 as opaque data that is used to aid analysis of the mirrored data. For example, intercept id 124 may be an integer that correlates a particular user to the mirrored packet flow. In some cases, the use of intercept id 124 is in the domain of LEA 10. LEA 10 may map intercept id 124 to a record included in LEA 10 that provides information about the user designated for lawful intercept or the traffic being mirrored. In other cases, intercept id 124 may be mapped to a record in mediation device/analyzer 22, which resides in the domain of service provider network 6.

Version 122 is extensible for various analyzer implementations. For example, version 122 may be a 2 bit integer that only changes when the format of intercept header 114 changes. In this way, various implementations of intercept header 114 may be allowed to coexist in mediation device/analyzer 22. Version 122 enables mediation device/analyzer 22 to decapsulate intercept header 114 of correlation header 111. In this manner, packet structure 110 is able to support various analyzer-specific implementations.

Session id 126 is used to identify the interface from which the packet stream is mirrored. However, the entire acct-session id may not necessarily be included in intercept header 114. In some cases, only the dynamic portion of the acct-session id, i.e., the lower 32 bits which is unique for each session, is included in intercept header 114. Mediation device/analyzer 22 may use the abbreviated session id 126 included in intercept header 114 in a look-up table that correlates the dynamic session id 126 to the actual acct-session id. In some embodiments, mediation device/analyzer 22 may choose to use the abbreviated session id 126 differently. The actual acct-session id may, for example, specify asynchronous transfer mode (ATM) and virtual circuit, Fast Ethernet and port, Gigabit Ethernet and port, serial, IP or other interface type and related information.

Mirrored packet structure 110 is designed to keep overhead low on each mirrored packet. As illustrated in FIG. 14, in one embodiment, intercept id field 124 is thirty bits long and version field 122 takes two bits. In some cases a sub-version field may be introduced once the last bit of version field 122 is used. In this way, intercept header 114 within correlation 111 may be relatively compact and expanded only when needed.

Figure 15:
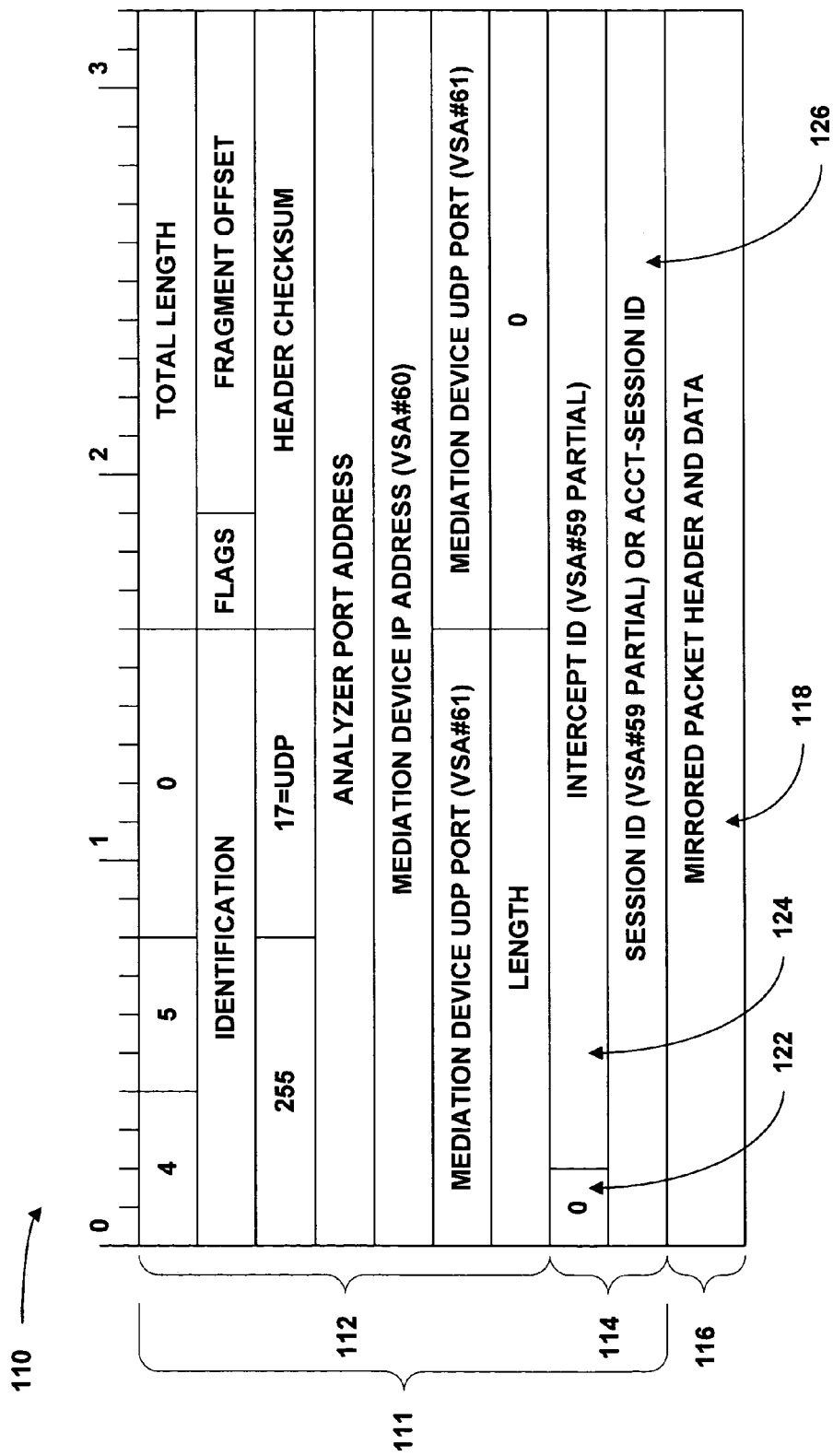
FIG. 15 illustrates the mirrored packet structure from FIG. 14 with default values.

FIG. 15 illustrates mirrored packet structure 110 from FIG. 14 with default values. Fields shown in FIG. 15 without an assigned value will be dynamically calculated for each mirrored packet. Example default values are assigned for source and destination address and port fields within routing header 112 of correlation header 111. The source address is the analyzer port address, which designates the location of edge router 18 or another network service device that mirrors the network traffic. The destination address is the IP address for mediation device/analyzer 22 as specified by the mediation device IP address (VSA #60) (FIG. 10). In other words, the mediation device IP address attribute indicates the IP address of the analyzer where the mirrored traffic is to be forwarded. Both the source and destination ports are designated by mediation device UDP port number (VSA #61) (FIG. 10), which indicates the UDP port number of an analysis application running on mediation device/analyzer 22 that receives the mirrored packets.

As shown in FIG. 15, version 122 is set to a value of 0. The value of version 122 may only change when the format of intercept header 114 is changed. The lawful intercept identifier (VSA #59) may include both intercept id 124 and session id 126. In that case, the format of the lawful intercept identifier attribute comprises an 8 byte hexadecimal string in which the first two most significant bits in the first word has a value 0, the lower 30 bits of the first word contains intercept id 124 and the second word contains session id 126. This format allows session ID 126 to be specified in authentication device 16 rather than deducing it from the acct-session-id.

In other embodiments, the lawful intercept identifier attribute may include only intercept id 124. In that case, the format of the lawful intercept identifier attribute comprises a 4 byte hexadecimal string in which the first two most significant bits in the word has a value 1 and the lower 30 bits of the word contains intercept id 124. Edge router 18 will choose the lower 32 bits of the acct-session-id as session id 126. This format allows correlation between intercept header 114 and the user designated for lawful intercept.

Figure 16:
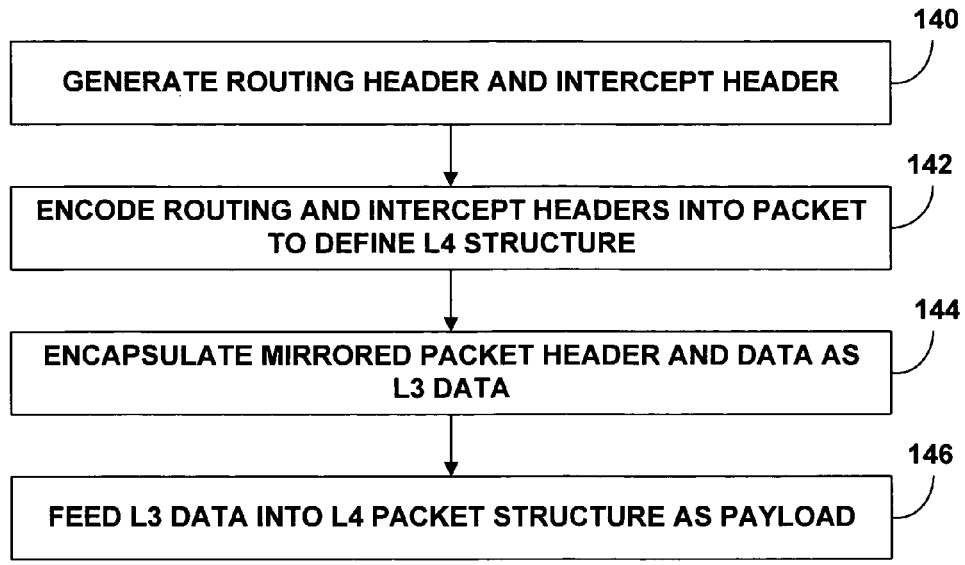
FIG. 16 is a flow chart illustrating an exemplary method for encapsulating a mirrored packet formed in accordance with the mirrored packet structure from FIG. 13.

FIG. 16 is a flow chart illustrating a method for encapsulating mirrored packet header and data 118 in mirrored packet structure 110 from FIG. 13. Initially, LEA 10 provides routing header 112 and intercept header 114 (140). Edge router 118 or another network device encodes routing header 112 and intercept header 114 into mirrored packet structure 110 to define an L4 structure (142). Edge router 118 than encapsulates mirrored packet header and the intercepted packet header and data 118 as L3 data (144). The L3 data is then fed by the edge router into payload 116 of the L4 mirrored packet structure 110 (146). In this way, network traffic may be monitored at any point in the network, and sent as routable packets to an analyzer. Thus, an analyzer may be used to collect data packets of any network type encapsulated in packet structure 110 and is able differentiate between the types of data packets based on the embedded information.

Figure 17:
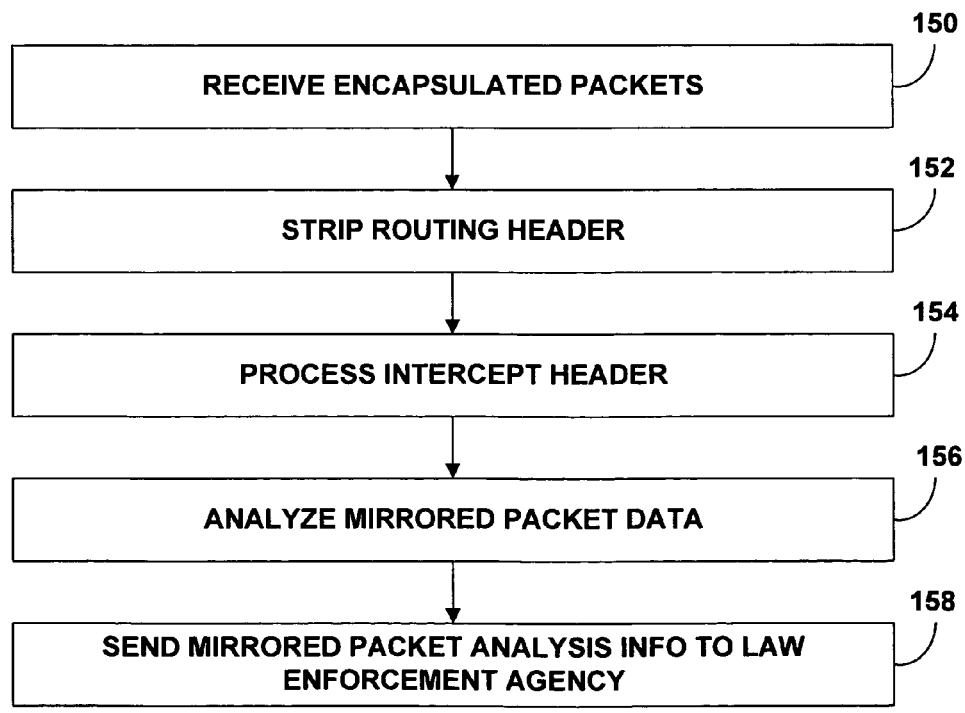
FIG. 17 is a flow chart illustrating exemplary transmission of data within the mirrored packet structure via the mediation device/analyzer from FIG. 7.

FIG. 17 is a flow chart illustrating exemplary processing of data in accordance with mirrored packet structure 110 via mediation device/analyzer 22 (FIG. 2). Mediation device/analyzer 22 receives mirrored packets encapsulated in accordance with mirrored packet structure 110 (150) from edge router 18 (FIG. 2).

Mediation device/analyzer 22 compresses the received data and removes unwanted data. For example, mediation device/analyzer 22 strips routing header 112 from the received mirrored packet (152), and processes intercept header 114 (154). In particular, mediation device/analyzer 22 processes intercept header 114 to determine version 122 and intercept id 124. As described above, version 122 provides support for a specific analyzer implementation while intercept id 124 provides a unique identifier associated with a user designated for lawful intercept. Mediation device/analyzer 22 may also analyze session id 126 to select appropriate processing rules based on the interface from which the packet stream is mirrored.

Based on this information, mediation device/analyzer 22 extracts and analyzes the mirrored packet header and data 118 (156) to generate mirrored packet analysis information. Mediation device/analyzer 22 sends mirrored packet analysis information to LEA 10 for review and further analysis.

Various embodiments of the invention have been described. These and other embodiments are within the scope of the following claims.

The invention claimed is:

1. A method comprising:
   with a network device, intercepting packets of a network flow associated with a network user;
   with the network device, forming routable packets that contain the intercepted packets;
   embedding user information within the routable packets that identifies the network user;
   embedding information within the routable packets that identifies an interface of an intercept device used to intercept the packets associated with the network user, wherein the information comprises session information unique to a session associated with the network user; and
   forwarding the routable packets through a network to an analyzer.

2. The method of claim 1, wherein forming routable packets comprises forming the routable packets to contain the intercepted packets within payloads of the routable packets.

3. The method of claim 1, wherein forming routable packets comprises prepending a header to each of the intercepted packets to form a respective one of the routable packets.

4. The method of claim 3, wherein the header comprises a correlation header and wherein prepending the correlation header comprises prepending a routing header and an intercept header.

5. The method of claim 4, wherein the routing header comprises a User Datagram Protocol/Internet Protocol (UDP/IP) header and the intercept header comprises an analyzer-specific header.

6. The method of claim 1, wherein intercepting packets comprises intercepting packets that conform to the second layer (L2) of the Open System Interconnection (OSI) model.

7. The method of claim 6, wherein forming routable packets comprises associating forwarding information with each of the intercepted packets to form the routable packets that conform to a layer higher than the second layer of the OSI model.

8. The method of claim 7, wherein the routable packets conform to the third layer (L3) of the OSI model.

9. The method of claim 7, wherein the forwarding information includes a network address for the analyzer.

10. The method of claim 1, further comprising embedding analysis information within the routable packets for use by the analyzer.

11. The method of claim 1, wherein the interface comprises one of an asynchronous transfer mode (ATM) interface, a Layer 2 Tunneling Protocol (L2TP) session interface, a Fast Ethernet interface, a Gigabit Ethernet interface, a serial interface or an Internet Protocol (IP) interface.

12. The method of claim 1, further comprising embedding version information within the routable packets, wherein the version information identifies an analyzer type associated with the analyzer.

13. The method of claim 1, wherein intercepting packets comprises copying the packets associated with the network flow to produce mirrored packets.

14. The method of claim 1, further comprising:
   receiving with a router an intercept request issued by an authentication device, wherein the intercept request identifies the network user; and
   intercepting the packets associated with the network user in response to the intercept request.

15. The method of claim 14, wherein receiving with a router an intercept request comprises receiving the intercept request from a Remote Authentication Dial-In User Service (RADIUS) server.

16. The method of claim 14, wherein the intercept request specifies a network address associated with the analyzer.

17. The method of claim 14, wherein the intercept request specifies a network session associated with the user.

18. The method of claim 1, wherein intercepting the packets comprises intercepting the packets with a broadband remote access server (BRAS).

19. The method of claim 1, wherein intercepting the packets comprises intercepting the packets with a router.

20. A network device comprising a mirroring module that intercepts packets of a network flow associated with a network user, and forwards routable packets that contain the intercepted packets through a network to an analyzer,
   wherein the mirroring module forms each of the routable packets to include a header that comprises:
   an interception identifier field that identifies the network user; and
   an account session field that identifies an interface of the network device from which the packets were intercepted, wherein the account session field comprises a session unique portion of an account session identification integer.

21. The network device of claim 20, wherein the mirroring module forms the routable packets to contain the intercepted packets within payloads of the routable packets.

22. The network device of claim 20, wherein the mirroring module prepends the header to each of the intercepted packets to form a respective one of the routable packets.

23. The network device of claim 22, wherein the header comprises a correlation header that includes a routing header and an intercept header.

24. The network device of claim 23, wherein the routing header comprises a User Datagram Protocol/Internet Protocol (UDP/IP) header and the intercept header comprises an analyzer-specific header.

25. The network device of claim 20, wherein the intercepted packets conform to the second layer (L2) of the Open System Interconnection (OSI) model.

26. The network device of claim 25, wherein the mirroring module associates forwarding information with each of the intercepted packets to form the routable packets that conform to a layer higher than the second layer of the OSI model.

27. The network device of claim 26, wherein the routable packets conform to the third layer (L3) of the OSI model.

28. The network device of claim 26, wherein the forwarding information includes a network address for the analyzer.

29. The network device of claim 20, wherein the mirroring module embeds analysis information within the routable packets for use by the analyzer.

30. The network device of claim 20, wherein the mirroring module embeds user information within the routable packets, wherein the user information identifies the network user.

31. The network device of claim 20, further comprising an interface that receives the network flow and intercepts the packets, wherein the mirroring module embeds information within the routable packets that identifies the interface.

32. The network device of claim 31, wherein the interface comprises one of an asynchronous transfer mode (ATM) interface, a Layer 2 Tunneling Protocol (L2TP) session interface, a Fast Ethernet interface, a Gigabit Ethernet interface, a serial interface or an Internet Protocol (IP) interface.

33. The network device of claim 20, wherein the mirroring module embeds version information within the routable packets, wherein the version information identifies an analyzer type associated with the analyzer.

34. The network device of claim 20, wherein the mirroring module copies the packets associated with the network flow to produce mirrored packets.

35. The network device of claim 20, wherein the network device comprises a broadband remote access server (BRAS).

36. The network device of claim 20, wherein the network device comprises a router.

37. The network device of claim 36, wherein the router includes an authentication module that receives an intercept request issued by an authentication device, wherein the intercept request identifies the network user.

38. The network device of claim 37, wherein the router intercepts the packets associated with the network user in response to the intercept request.

39. The network device of claim 37, wherein the router receives the intercept request from a Remote Authentication Dial-In User Service (RADIUS) server.

40. The network device of claim 37, wherein the intercept request specifies a network address associated with the analyzer.

41. The network device of claim 37, wherein the intercept request specifies a network session associated with the user.

42. The network device of claim 20, further comprising a control unit that maintains routing information in accordance with a topology of a network, wherein the control unit forwards the routable packets to the analyzer in accordance with the routing information.

43. The network device of claim 20, wherein the header further comprises:
a destination field that identifies a network address associated with the analyzer; and
a version field that includes analyzer-specific information.

44. A network device comprising:
a mirroring module that intercepts packets of a network flow associated with a network user, and forms routable packets that contain the intercepted packets,
wherein the mirroring module forms each of the routable packets to include a header that comprises:
a destination field that identifies a network address associated with an analyzer;
an interception identifier field that identifies the network user;
a version field that includes analyzer-specific information; and
an account session field that identifies an interface of the network device from which the packets were intercepted, wherein the account session field comprises a session unique portion of an account session identification integer.

45. A non-transitory computer readable medium comprising a packet generated by a network device from a network flow associated with a network user, wherein the packet comprises:
a destination field that directs a router to forward the packet to an analyzer;
an interception identifier field that identifies the network user;
a version field that controls analysis of the packet by the analyzer; and
an account session field that identifies an interface of the network device from which the packets were intercepted, wherein the account session field comprises a session unique portion of an account session identification integer.

46. A non-transitory computer-readable medium comprising instructions to cause a programmable processor to:
intercept packets of a network flow associated with a network user;
form routable packets that contain the intercepted packets;
embed user information within the routable packets that identifies the network user;
embed information within the routable packets that identifies an interface of an intercept device used to intercept the packets associated with the network user, wherein the information comprises session information unique to a session associated with the network user; and
forward the routable packets through a network to an analyzer.

47. The non-transitory computer-readable medium of claim 46, wherein the instructions cause the programmable processor to form the routable packets to contain the intercepted packets within payloads of the routable packets.

48. The non-transitory computer-readable medium of claim 46, wherein the instructions cause the programmable processor to prepend a header to each of the intercepted packets to form a respective one of the routable packets.

49. The non-transitory computer-readable medium of claim 46, wherein the instructions cause the programmable processor to:
intercept packets that conform to the second layer (L2) of the Open System Interconnection (OSI) model; and
associate forwarding information with each of the intercepted packets to form the routable packets that conform to a layer higher than the second layer of the OSI model.

50. The non-transitory computer-readable medium of claim 49, wherein the routable packets conform to the third layer (L3) of the OSI model.

* * * * *